(12) United States Patent
Jijina et al.

(10) Patent No.: US 7,010,289 B2
(45) Date of Patent: Mar. 7, 2006

(54) METHOD AND SYSTEM FOR VEHICLE DATA UPLOAD

(75) Inventors: Jasmin Jijina, West Bloomfield, MI (US); Edward J. Abeska, Ferndale, MI (US); Richard J. Kacel, Waterford, MI (US); Jeffrey M. Stefan, Clawson, MI (US)

(73) Assignee: General Motors Corporation, Detroit, MI (US)

( * ) Notice: Subject to any disclaimer, the term of this patent is extended or adjusted under 35 U.S.C. 154(b) by 467 days.

(21) Appl. No.: 10/154,500

(22) Filed: May 24, 2002

(65) Prior Publication Data

US 2004/0203696 A1    Oct. 14, 2004

(51) Int. Cl.
*H04Q 7/20* (2006.01)

(52) U.S. Cl. .................. 455/412.1; 455/420; 701/1; 701/117; 701/209

(58) Field of Classification Search .............. 701/1, 701/35, 117–119, 200, 123, 29, 201, 202, 701/209, 210; 340/905, 934, 992, 995.13, 340/870.01, 870.16, 435, 903, 539; 455/423, 455/426.1, 412.1, 412.2
See application file for complete search history.

(56) References Cited

U.S. PATENT DOCUMENTS

| 4,591,823 | A | 5/1986 | Horvat |
|---|---|---|---|
| 4,744,083 | A | 5/1988 | O'Neill et al. |
| 4,792,803 | A | 12/1988 | Madnick et al. |
| 5,126,941 | A | 6/1992 | Gurmu et al. |
| 5,164,904 | A | 11/1992 | Sumner |
| 5,182,555 | A | 1/1993 | Sumner |
| 5,247,439 | A | 9/1993 | Gurmu et al. |
| 5,297,049 | A | 3/1994 | Gurmu et al. |
| 5,539,645 | A | 7/1996 | Mandhyan et al. |
| 6,012,012 | A | 1/2000 | Fleck et al. |
| 6,092,020 | A | 7/2000 | Fastenrath et al. |
| 6,177,885 | B1 | 1/2001 | Weil et al. |
| 6,249,232 | B1 * | 6/2001 | Tamura et al. ............. 340/902 |
| 6,611,740 | B1 | 8/2003 | Lowrey et al. ............. 701/29 |
| 6,714,857 | B1 * | 3/2004 | Kapolka et al. ............ 701/123 |

OTHER PUBLICATIONS

U.S. Appl. No. 10/244,193, filed Sep. 16, 2002, Edward J. Abeska et al.

* cited by examiner

*Primary Examiner*—Jean Gelin
(74) *Attorney, Agent, or Firm*—Anthony Luke Simon (57) ABSTRACT

The invention provides a method for vehicle data upload by activating at least one action trigger as a function of a vehicle communication unit, collecting at least one attribute data within a mobile vehicle, transmitting the attribute data from the vehicle communication unit to a mobile network intelligence, determining a second attribute data, producing a second action trigger, transmitting the second action trigger from the mobile network intelligence to the vehicle communication unit, and overwriting the action trigger as the second action trigger.

10 Claims, 3 Drawing Sheets

METHOD AND SYSTEM FOR VEHICLE DATA UPLOAD

FIELD OF THE INVENTION

In general, the invention relates to data transmission over a wireless communication system. More specifically, the invention relates to a method and system for communicating a mobile vehicle's attributes and associated information.

BACKGROUND OF THE INVENTION

Telematic communication units (TCU's), such as cellular phones, personal data assistants (PDA's), Global Positioning System (GPS) devices, and on-board Vehicle Communication Units (VCU's), used in conjunction with a Wide Area Network (WAN), such as a cellular telephone network or a satellite communication system, have made it possible for a person to send and receive voice communications, data transmissions, and facsimile (FAX) messages from virtually anywhere on earth. Such communication is initiated at the TCU when it is turned on, or by entering a phone number to be called, or in many cases, by pressing a preprogrammed button on the TCU or speaking a voice command causing the TCU to automatically complete the process of dialing the number to be called. A radio communication link is established between the TCU and a Wide Area Network (WAN), using a node of the WAN in the vicinity of the TCU.

In cellular telephone systems, a node is commonly referred to as a "cellular base station." Once the radio communication link between the TCU and the cellular base station has been established, the base station then utilizes a combination of additional cellular stations, conventional telephone wire line networks, and possibly even satellite systems to connect the TCU to the number to be called.

Wireless communication services such as navigation and roadside assistance for TCU users have increased rapidly in recent years. More specialized services have been offered for VCU users, and may aid motor vehicle operations and include services that provide location and destination information. Such services are provided at a cost to the VCU users, and also at a cost to the VCU service provider. Certain classes of VCU services require the periodic and intermittent access, collection, buffering, and transmission of vehicle specific or location data. These data intensive services potentially can have significant transmission (uploading) costs associated with them, again at a cost to the VCU service provider and ultimately the VCU users.

Thus, there is a significant need for a method and system for optimizing wireless communication services, vehicle information data uploading, and vehicle geographic information collection that overcome the above disadvantages and shortcomings, as well as other disadvantages.

SUMMARY OF THE INVENTION

One aspect of the invention presents a method for vehicle data upload by activating at least one action trigger as a function of a vehicle communication unit, collecting at least one attribute data (datum if only one) within a mobile vehicle as a function of the action trigger, and transmitting the attribute data (datum) from the vehicle communication unit to a mobile network intelligence. A second attribute data is determined as a function of the attribute data, and a second action trigger is produced as a function of the second attribute data. The method continues by transmitting the second action trigger from the mobile network intelligence to the vehicle communication unit, and overwriting the action trigger as a function of the second action trigger.

Another aspect of the invention presents a system for vehicle data upload. The system includes a means for activating at least one action trigger as a function of a vehicle communication unit, means for collecting at least one attribute data within a mobile vehicle as a function of the action trigger, means for transmitting the attribute data from the vehicle communication unit to a mobile network intelligence, means for determining a second attribute data as a function of the attribute data, means for producing a second action trigger as a function of the second attribute data, means for transmitting the second action trigger from the mobile network intelligence to the vehicle communication unit, and means for overwriting the action trigger as a function of the second action trigger.

Another aspect of the invention provides a computer readable medium for storing a computer program. The computer program is comprised of computer readable code for activating at least one action trigger as a function of a vehicle communication unit, computer readable code for collecting at least one attribute data within a mobile vehicle as a function of the action trigger, computer readable code for transmitting the attribute data from the vehicle communication unit to a mobile network intelligence, computer readable code for determining a second attribute data as a function of the attribute data, computer readable code for producing a second action trigger as a function of the second attribute data, computer readable code for transmitting the second action trigger from the mobile network intelligence to the vehicle communication unit, and computer readable code for overwriting the action trigger as a function of the second action trigger.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF A PREFERRED EMBODIMENT

Figure 1:
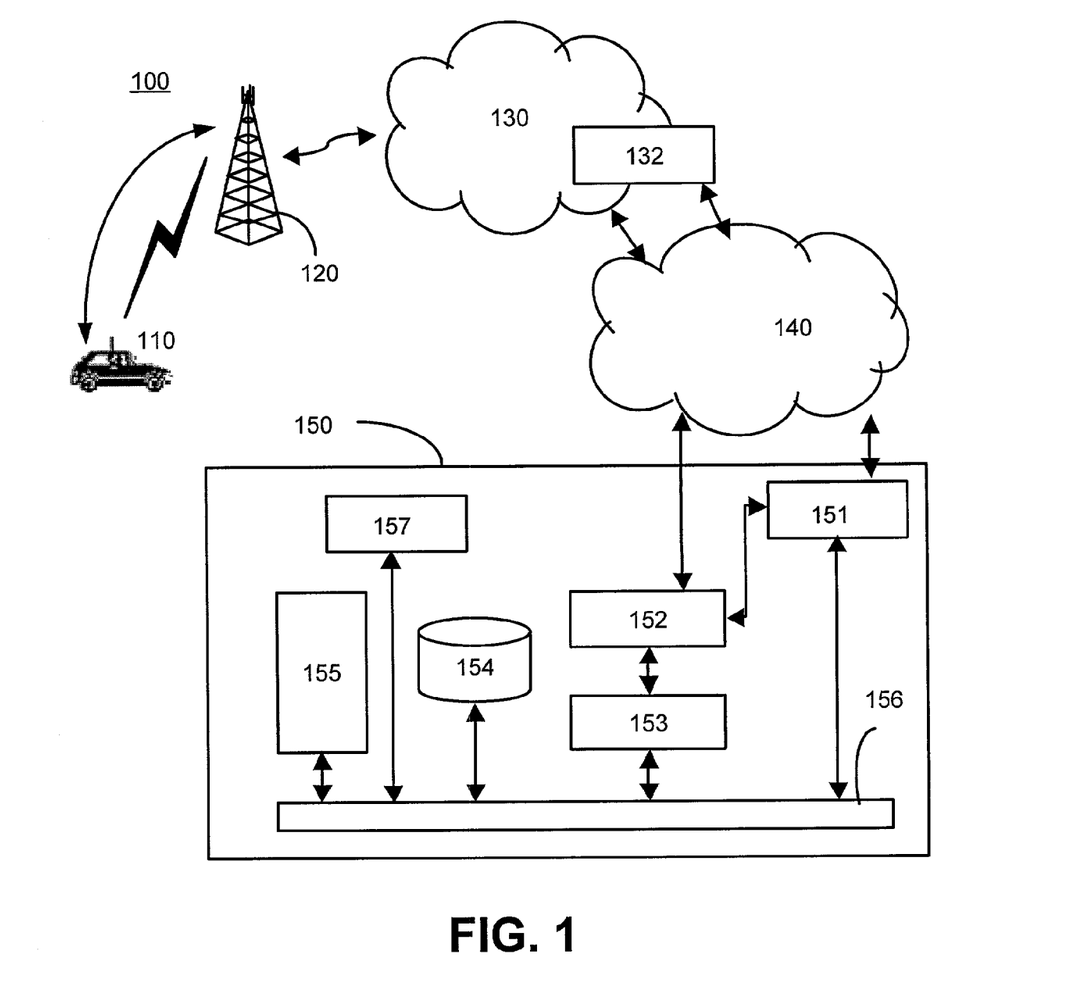
FIG. 1 is a schematic diagram for one embodiment of a system for accessing a mobile vehicle using a wireless communication system, in accordance with the current invention.

FIG. 1 is an illustration depicting one embodiment of a system for communicating with a mobile vehicle using a wireless communication system in accordance with the present invention, and may he referred to as a mobile vehicle communication system (MVCS) 100. The mobile vehicle communication system 100 may contain one or more mobile vehicles 110, with the wireless communication system containing one or more wireless carrier systems 120, one or more communication networks 130, one or more short message service centers 132, one or more and networks 140, and one or more call centers 150. Call center 150 may contain one or more switches 151, one or more data transmission devices 152, one or more communication services managers 153, one or more communication services databases 154, one or more advisors 155, one or more enterprise bus systems 156, and one or more automated speech recognition (ASR) units 157. The term "data" throughout the detailed description may refer to at least one datum, or a multitude of data.

Mobile vehicle 110 may contain a wireless telematic communication unit (TCU), such as a cellular phone, personal data assistant (PDA), global positioning system (GPS) device, and/or an on-board vehicle communication unit (VCU), with suitable hardware and software for transmitting and receiving data communications. The VCU may contain a wireless modem for transmitting and receiving data, and a digital signal processor with software and additional hardware to enable communications between the mobile vehicle 110 and one or more of the remaining MVCS 100 components. The GPS unit within mobile vehicle 110 may be capable of determining synchronized time and a geophysical location of the mobile vehicle 110. Mobile vehicle 110 may contain a speech recognition system (ASR) capable of communicating with the VCU. The VCU may additionally be capable of functioning as one or more of the above communication devices and, for one embodiment of the invention, may include at least one function from the list of data storage, data retrieval, receiving data queries, processing data queries, and transmitting data queries.

Wireless carrier system 120 may be a wireless communications carrier or a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 120 may transmit to and receive signals from mobile vehicle 110. Wireless carrier system 120 may transmit to and receive signals from a second mobile vehicle 110. Wireless carrier system 120 may be connected with communications network 130. Additionally, wireless carrier system 120 may contain or be in communication with a mobile network intelligence (MNI (not shown)). For one embodiment of the invention the MNI may be a network or server based artificial intelligence used for receiving, processing, and transmitting data from mobile vehicle 110.

Communications network 130 may comprise a mobile switching center, and may also contain or be in communication with the MNI. Communications network 130 may comprise services from one or more wireless communications companies. Communications network 130 may be any suitable system or collection of systems for connecting wireless carrier system 120 to at least one mobile vehicle 110 or to a call center 150. Communications network 130 may include one or more short message service centers 132.

Short message service center 132 may facilitate alphanumeric short messages to and from mobile vehicles 110. Short message service center 132 may include message entry features, administrative controls, and message transmission capabilities. Additionally, short message service center 132 may store and buffer the messages. The short message service center 132 may include one or more automated speech recognition (ASR) units. The short message services offered may include functional services such as paging, text messaging and message waiting notification. Additional short message services may include other telematic services such as broadcast services, time-driven message delivery, autonomous message delivery, and database-driven information services. The telematic services may further include message management features, such as message priority levels, service categories, expiration dates, cancellations, and status checks.

Land network 140 may be a public-switched telephone network, and may be comprised of a wired network, an optical network, a fiber network, another wireless network, or any combination thereof. The land network 140 may also include an Internet protocol (IP) network. Land network 140 may connect communications network 130 to the call center 150. Land network 140 may connect a first wireless carrier system 120 with a second wireless carrier system 120. Communication network 130 and land network 140 may connect wireless carrier system 120 to a communication node or call center 150. In one embodiment of the invention, a communication system may reference all or part of the wireless carrier system 120, communications network 130, land network 140, and short message service center 132.

Call center 150 may be a location where many calls can be received and serviced at the same time, or where many calls may be sent at the same time. The call center 150 may be a telematic call center, facilitating communications to and from mobile vehicles 110. The call center 150 may be a voice call center, providing verbal communications between an advisor in the call center 150 and a subscriber in a mobile vehicle 110. The call center 150 may be a voice activated call center, providing verbal communications between an ASR unit and a subscriber in the mobile vehicle 110. The call center 150 racy contain any of the previously described functions, and may contain any combination of hardware or software facilitating data transmissions between call center 150 and mobile vehicle 110.

The call center 150 may contain or be in communication with the MNI, therefore any reference to the MNI within embodiments of this invention may provide the MNI in part, in whole, or in a combination of intelligence within the wireless carrier system 120, communications network 130, and the call center 150. The call center 150 may further contain a switch 151. Switch 151 may be connected to land network 140, and may receive a modem signal from an analog modem or from a digital modem. Switch 151 may transmit voice or data transmission from the communication node. Switch 151 may also receive voice or data transmissions from mobile vehicle 110 through wireless carrier system 120, communications network 130, and land network 140. Switch 151 may receive from or send data transmissions to data transmission device 152. Switch 151 may receive from or send voice transmissions to advisor 155 via enterprise bus system 156. Switch 151 may receive from or send voice transmissions to one or more automated speech recognition (ASR) units 157 via enterprise bus system 156.

Data transmission device 152 may send or receive data from switch 151, and may be an IP router or a modem. Data transmission device 152 may transfer data to or from advisor 155, one or more communication services managers 153, one or more communication services databases 154, one or more automated speech recognition (ASR) units 157, and any other device connected to enterprise bus system 156. Furthermore, data transmission device 152 may convey information received from short message service center 132 in communication network 130 to communication services manager 153.

Communication services manager 153 may be connected to switch 151, data transmission device 152, and advisor 155 through enterprise bus system 156. Communication services manager 153 may receive information from mobile vehicle 110 through wireless carrier system 120, short message service center 132 in communication network 130, land network 140, and data transmission device 152. Communication services manager 153 may send information to mobile vehicle 110 through data transmission device 152, land network 140, communication network 130 and wireless carrier system 120. Communication services manager 153 may send short message service messages via short message service center 132 to the mobile vehicle. Communication services manager 153 may receive short message service replies from mobile vehicle 110 via short message service center 132. Additionally, communication services manager 153 may send a short message service request to mobile vehicle 110.

In another embodiment of the invention, short message service (SMS) communications may be sent and received according to established protocols such as IS-637 standards for SMS, IS-136 air interface standards for SMS, and global standard for mobile communication (GSM) 03.40 and 09.02. These protocols allow for example, short messages comprised of up to 160 alpha-numeric characters and, in one embodiment, could contain no images or graphics. Similar to paging, an SMS communication may be posted along with an intended recipient, such as a communication device in mobile vehicle 110. The SMS communication may be sent by a communication services manager 153 in the call center 150, transferred to a short message service center (SMSC), and conveyed to the intended recipient.

In one embodiment of the invention, mobile vehicle 110 may receive an SMS message when the ignition is on, or when put into an SMS-ready or service-ready mode while the ignition is off. The mobile vehicle 110 may be placed in a powered down or sleep cycle mode while the ignition is off. When the mobile vehicle is placed into a service ready mode, the phone in the mobile vehicle may register with a local wireless carrier if needed, or with the subscriber's home system if the mobile vehicle is not roaming. If an SMS message is waiting to be sent, the wireless carrier may deliver the message and the mobile phone may acknowledge receipt of the message by an acknowledgment to the SMSC. Mobile vehicle 110 may perform an operation in response to the SMS message, and may send an SMS reply message back to the call center 150. Similarly, another embodiment of the mobile vehicle 110 may originate an SMS message to the call center 150 through the SMSC.

In one embodiment of the invention, the communication services manager 153 may determine whether an SMS communication should be sent to, or an upload requested from mobile vehicle 110. An SMS message may be initiated in response to a subscriber request, such as a request to unlock the vehicle doors. An SMS message may be sent automatically, for example, when an upload of vehicle preset values is desired or when a diagnostic message is needed. In another embodiment of the invention, a SMS message may be sent periodically to upload the location and status of mobile vehicle 110, and for another embodiment of the invention to request data collection, data retrieval, and/or data submission from mobile vehicle 110. Communication services manager 153 may also provide further requests and determinations based on a reply from mobile vehicle 110. Communication services manager 153 may provide information to mobile vehicle 110 from communication services database 154.

Communication services database 154 may contain records on one or more mobile vehicles 110. A portion of communication services database 154 may be dedicated to short message services. Records in communication services database 154 may include vehicle identification, location information, diagnostic information, status information, recent action information, and vehicle passenger (user) and operator (user) defined preset conditions regarding mobile vehicle 110. Communication services database 154 may provide information and other support to communication services manager 153, and in one embodiment of the invention to external services. External services can be for example, vehicle repair services, rental agencies, marketing firms, manufacturers, and wireless carriers. Another embodiment of the invention may require external services to be authorized, such as having a multi-use license, or pre-approved such as for a one-time use.

Figure 2:
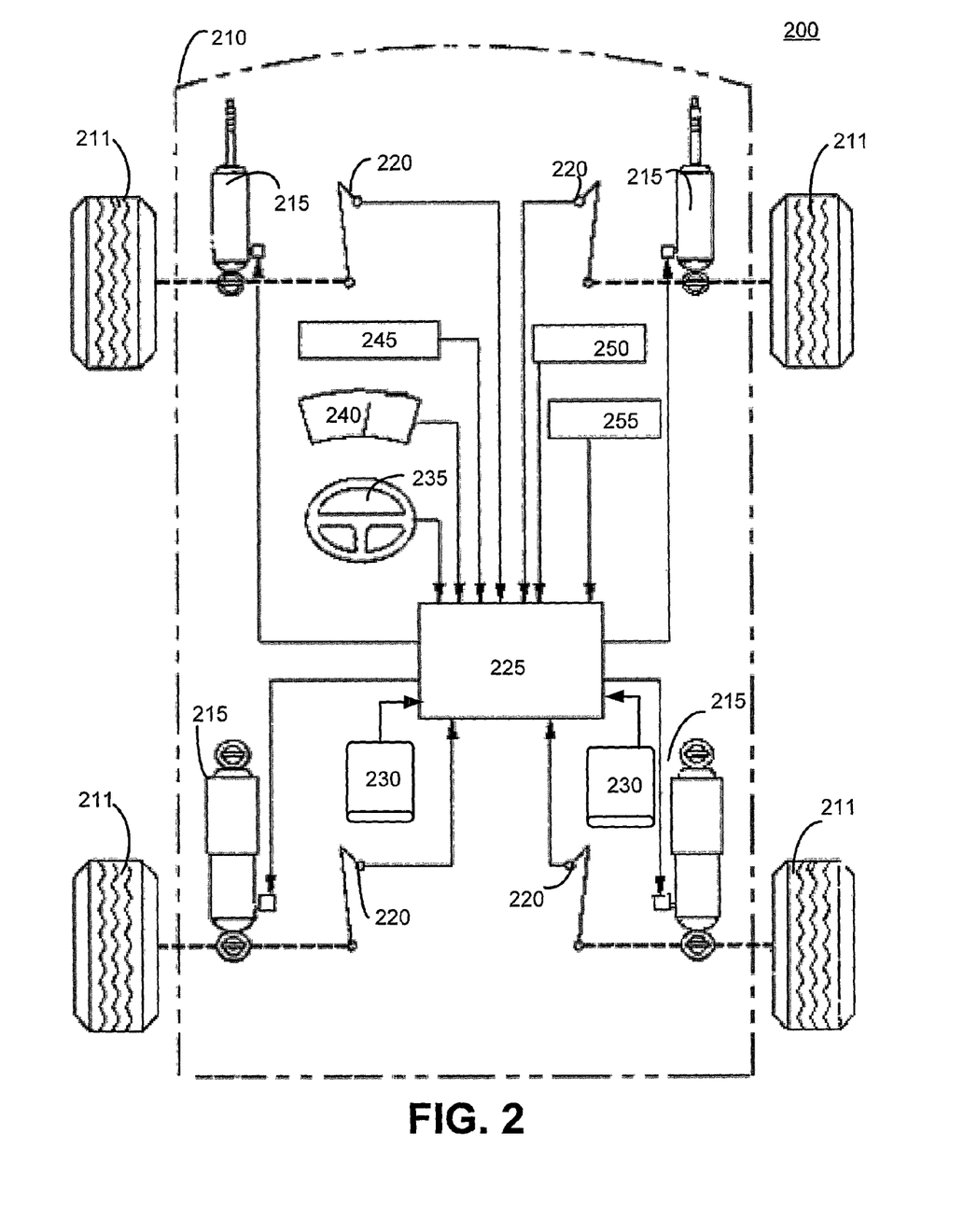
FIG. 2 is a schematic view of one embodiment of an apparatus capable of utilizing the systems of FIG. 1, in accordance with the present invention.

FIG. 2 illustrates one embodiment of the invention as an example mobile vehicle (vehicle) 200, and may utilize one or more embodiments previously detailed. For one embodiment of the invention, the vehicle 200 may be comprised of a vehicle body 210 supported by four wheels 211 and by four suspension devices including springs (not shown), all of a type known in the art. Each suspension may include a variable-force real time controllable damper 215, connected to exert a vertical force between wheel 211 and body 210 at that suspension point. There are many such suspension arrangements known in the art and all are appropriate to this invention.

Each corner of the vehicle may include a linear position sensor 220 that provides an output signal specifying the relative distance between the vehicle wheel and the suspended vehicle body at that corner of the vehicle. Suitable position sensors 220 can be easily constructed by those skilled in the art and any type of position sensor known in the art may be used. Each position sensor 220 may provide a signal to a VCU module 225. For one embodiment of the invention, the VCU module 225 may be in communication with the MNI (mobile network intelligence) described in FIG. 1.

In another embodiment of the invention, the outputs (suspension data) of the position sensors 220 may be uploaded to the MNI, which may process the signals to determine the state of the vehicle body 210 and wheels 211. Additionally, an embodiment of the invention may include sensors for one or any combination of vehicle attributes including seat position 230, vehicle speed 240, steering wheel angular position 235, radio settings 245, climate control (for variable atmospheric conditions) 250, and accessories such as mirror setting, dash lights, etc 255. An additional embodiment of the invention may include input signals (attributes) from various vehicle diagnostic sensors, and from sensors for any additional component known in the art and not previously mentioned. Obtaining such signals can be easily achieved using known types of sensors available to those skilled in the art. The signal data and any additional vehicle data may be stored in memory within or in communication with the VCU module 225, until uploaded from the vehicle 200.

Figure 3:
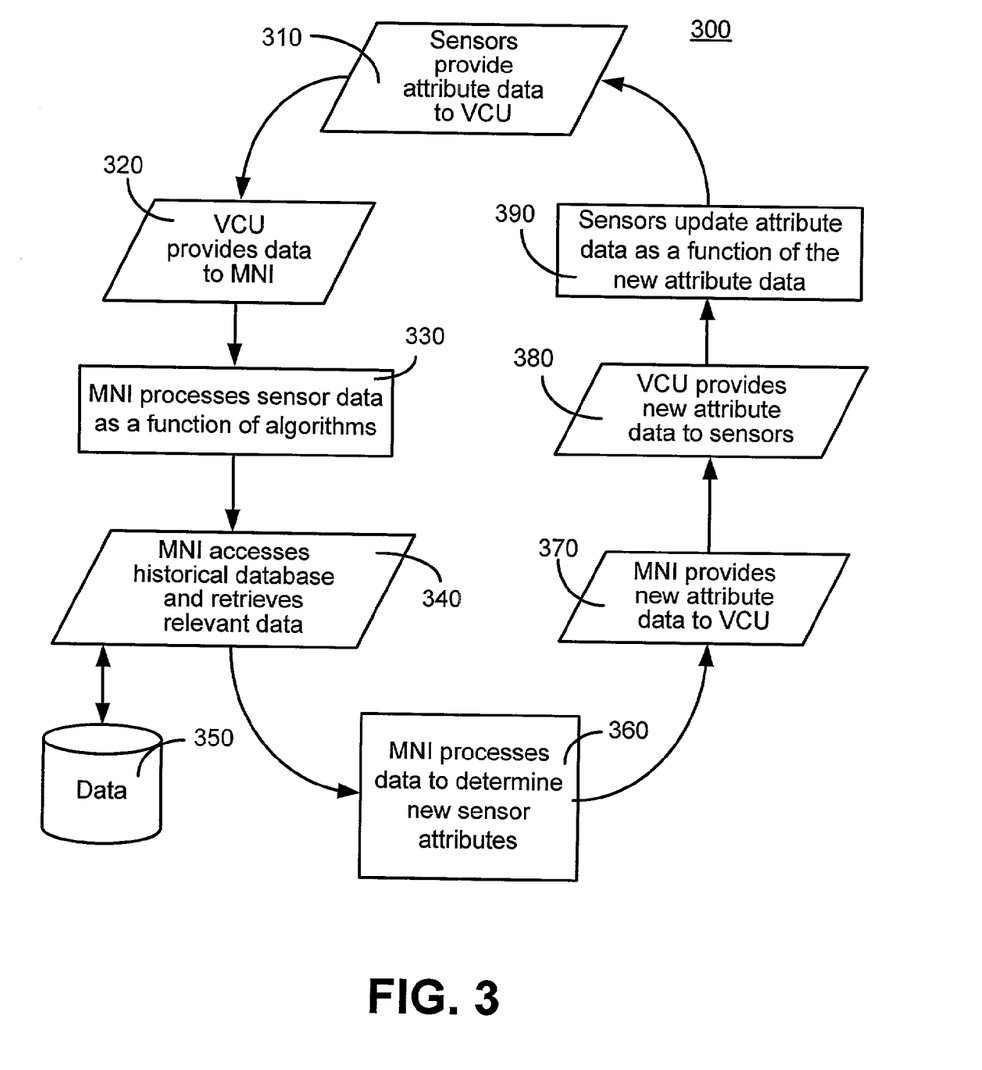
FIG. 3 is a flow chart representation for one embodiment of a vehicle data upload method utilizing the systems of FIG. 1 and FIG. 2, in accordance with the present invention.

FIG. 3 is a flow chart representation for one embodiment of an enhanced vehicle data upload method 300, utilizing one or more of the systems previously described in accordance with the present invention. The functionality of this embodiment may rely on the premise that a certain class of services needs to engage in the periodic and intermittent access, collection, buffering and uploading (transmitting) of vehicle or location specific data.

A class of services such as floating car data (FCD), server-based turn by turn (SBTBT) navigation, and usage based insurance (UBI) for example, require a common set of generic functionality that involves the access and capture of vehicle and/or location specific data at intermittent intervals. This functionality can extend to any data that is broadcast regularly or provided upon request by the VCU module, or alternatively any data that is specifically transmitted to an MNI at regular intervals. The data may be provided by the before mentioned sensors, as well as GPS capabilities and preset values accessible to the VCU module. Some common examples can include odometer and vehicle speed data, as well as GPS latitude and longitude values.

Each category of data may be accessed and buffered (stored) for the appropriate time interval, before it can be transmitted to an MNI, or for another embodiment of the invention, transmitted to a call center or wireless carrier with MNI capabilities. A further embodiment of the invention may provide a duplicate buffer if the size of the collected data is of the order of the time to empty a buffer during transmission, to ensure that there is no loss of data. One embodiment of the invention may provide the buffer as a computer readable medium as is known in the art.

Each service that may require this class of functionality may require access to a unique set of vehicle data, collected and transmitted in response to a unique trigger (action trigger) and/or timer. If intelligent collection and upload are preferred in order to minimize transmission costs and memory buffer requirements, then another embodiment of the invention may include a unique set of Boolean bits representing an action trigger, to indicate the desired collection and upload state. Intelligent algorithms within the MNI can toggle the individual states of these Boolean bits. These intelligent algorithms can in turn use other vehicle data (also uploaded) as inputs to additional MNI processes. For example, location upload inputs into an intelligent algorithm can help determine whether there is a need to continue the speed uploads at that time.

An action trigger for a specific attribute may be called a data trigger. For example, for one embodiment of the invention a data trigger may be included for corresponding values of minutes, kilometers, ignition on/off and continuous monitoring, as well as number of ignition cycles, timestamp, days, miles, and immediate call. Additionally, another type of action trigger may be called an event trigger and used within the invention for providing a bit-selectable value that is associated with an event, for example continuous monitoring of an attribute may be provided by an event trigger called a continuous monitoring trigger. When the continuous monitoring trigger parameter is deemed to have a TRUE (1) value, a storage trigger (event trigger) and/or an upload trigger (event trigger) may be activated, resulting in the storage in memory of an attribute value (data), as well as the transmission (upload) of the attribute value. A control algorithm that resides within the MNI can control the actual value of the continuous monitoring trigger, overwriting the previous value. This embodiment may be used as an example of an action trigger being comprised of a multiple of event triggers, such as the data storage trigger and the upload trigger. Another embodiment of the invention may provide that data triggers and event triggers be combined to form a single action trigger.

Thus by abstracting out the processor intensive complexity of data collection and upload, and the associated data storage, the MNI can perform any computation and assign its outcome in the form of a simple [1, 0] to the relevant parameter (attribute data) being continuously monitored. A continuous monitoring algorithm may periodically check the value of a relevant bus or internal data parameter and make the decision to store or upload accordingly. Another embodiment of the invention defines a new air interface (AIF protocol) message to reconfigure the parameter value of each new (overwritten) continuous monitoring trigger.

Another event trigger within an embodiment of the invention is an enhanced continuous monitoring trigger, and has a bit-selectable value associated with it implying that storage occurs when the value of the monitoring parameter for a specific record (attribute) type is 1, and not otherwise. The actual value of the parameter can then be remotely set in real time by a new AIF message that specifies the record type in addition to the parameter value. The value may be stored in a mailbox allocated to the parameter. This method ensures that the VCU is storing data only when required to do so.

The enhanced continuous monitoring trigger may therefore be associated with a new conditional logic for checking the real time value of the Bit-selectable parameter, before storing a new attribute data. Additionally, a configurable timer that delays the conditional logic from executing for a period of time specified by the timer may be associated with the enhanced continuous monitoring trigger. The conditional logic required for newly defined event triggers (for storage and upload of data), could overtax the processor if the time between collections of data (records) is excessively brief. Configurable timers may therefore be added to prescribe the time between executions of the conditional logic. The logic for a storage trigger within one embodiment of the invention may read something like the following pseudo code. The logic for an upload trigger shall read analogously:

```
If timer for storage expires;
    {Check value of trigger parameter;
        If real time Bit-selectable value of parameter is TRUE;
        {Store records (associated with a data trigger) until
        timer expires again;}
    else;}
else;
```

Another embodiment of the invention may associate each record type with an overwrite feature that can accomplish an override of automatic upload, for example an automatic upload may occur when the buffer for a specific attribute is 95% full. If the parameter is configured to be TRUE, the buffer must overwrite itself starting with a prescribed record placeholder, instead of executing a forced upload. An additional embodiment of the invention may provide a new bit-selectable upload trigger to be added to an upload event table. The upload event table can instruct an upload be performed only when necessary as determined by the MNI. The previously described overwrite feature may need to additionally be used in conjunction with this option, thus enabling buffer overwrite when full. Additionally, a bit-selectable value may be associated with the newly overwritten data trigger. The actual real time value of attribute data associated with the overwritten data trigger can be set as required by the MNI, based on the logic described within its algorithm. The value of this data may be compared against intended values, prior to triggering an upload.

For one embodiment of the invention, the new data and upload triggers defined above must be accompanied by the assignment of new record storage and upload Bit-selectable parameters whose values can be toggled by the MNI via a newly defined AIF message. This functionality can be duplicated for each record type that can be simultaneously stored and uploaded. Further within this embodiment of the invention, if the average time between consecutive storage events in a buffer has the same order of magnitude as the average time between upload events, it may be necessary to assign appropriate memory management schemes to ensure the continuity of data storage during upload.

Existing UBI functionality already includes the capability to upload relative data instead of absolute data with the intent of reducing payload and cost. An embodiment of the invention may expose this functionality to the upload of all record types for all applications. Additionally, UBI functionality may be extended to the storage of all record types for all applications. The alternative would be to increase available non-volatile memory. The tradeoff between the introduction of compression schemes or relative data schemes for storage on the one hand and an increased non-volatile memory on the other, may determine the embodiment to use.

Minor inaccuracies within individual data records could become very significant inaccuracies after several consecutive records are stored. This is especially true in cases where a record's data values are defined relative to the preceding record's data values. Another embodiment of the invention may prevent these inaccuracies by involving rigorous algorithms resident in the vehicle VCU module (VCU) or at the MNI, that can compare stored data to be uploaded against truth data collected by an independent reliable source, and correct for any discrepancies found. The truth data could be located within the vehicle, or at the MNI, and may be accessed from the VCU, MNI, database, or the like and stored in mailboxes analogous to those associated with VCU records. An algorithm may then compare data to be tested for accuracy against the truth data. If the difference exceeds a predefined acceptance threshold, the data source can be recalibrated against the truth data. This truth reference accuracy process may run periodically on a configurable timer.

Also, an embodiment of the invention may revise the existing AIF messages that communicate with action triggers and upload event tables by incorporating the new action triggers and their corresponding value placeholders. Additionally, new AIF messages may be defined to toggle the parameter values of an event trigger in a real time fashion, as well as to reconfigure timers, overwrite buffers, utilize the trailing digit preference, and to switch between absolute and relative buffers.

Another embodiment of the invention may provide methods to improve record payload efficiency. These methods may include:

Truncate leading, trailing and empty field zeros, wherein the record payload can be made more efficient by truncating leading and trailing zeros (depending on left/right justification) from fields as well as eliminating zeros from empty fields.

Sinusoids of angles, wherein the larger ranges for θ in degrees or radians can be replaced by the [−1,1] range of the Sine and Cosine functions. A configuration option can be set to determine user choice with the following options: degrees, radians, steradians, and sine/cosine.

Data relative to an initial point of reference within an ignition cycle, wherein the data recorded and transmitted within an ignition cycle can be minimized by requiring relative data to be stored and transmitted. Data quality can be ensured by using this feature in conjunction with truth referencing schemes previously mentioned. Two configuration options may be provided to specify user choice for storage as well as transmission. The first is relative data transmission, with the second relative data storage. The default values for these options may be set to absolute.

Choice of compression/tokenization schemes, wherein a configuration option may be provided to compress and/or tokenize each data type using existing or future compression/tokenization schemes. Generic pointers can be included to reference client-side lossless compression routines, thus providing the flexibility to add more routines in the future. Some such routines could include but are not limited to the following schemes: run length encoding, zero-order Huffman (Shannon-Fano), Move-To-Front, Lempel-Ziv Coding and the Burrows-Wheeler transform.

Implement Data Stripping for Trailing Digits, wherein trailing digits can be stripped off each data value to the requisite order of magnitude to reduce data payloads and transmission costs associated with them. The AIF message previously described may specify the number of digits to strip prior to storage and/or upload of data in a record.

Add tokenization algorithms to reduce the payload during upload or download. Within one embodiment of the invention, the application is compatible with the scheme suggested in Navigation AIF Packet Format. This function may be applied to all high payload transmission intensive applications.

To reduce the amount of data necessary for transmission, and to add flexibility, a stack-oriented math calculator function can be added to the invention. This calculator may have a fixed set of functions that can be specified. Examples are Add, Subtract, Multiply, Divide, Average, Sine, Cosine, etc. These functions can be applied to specific internal data as it is sampled during execution, and the results stored in memory buffers. In one embodiment of the invention, an equation specifies the math operators to execute, and the specific data to use for the operands. Tokenization and bitmapping may be used to specify the equation.

Next are specific embodiments that may utilize and greatly benefit from the generic functionality of the invention, as detailed above. They may present raw requirements posed by a class of services. The first of which is MNI-based route guidance. For example, a generated route consists of road information, such as freeways and arterials, coupled with maneuver instructions. For effective route following, the MNI must be aware of the vehicle's current location and heading at any point in time. Instead of continually uploading large payload transmissions, small payloads of trailing digits and/or relative coordinates of location data can keep the MNI updated with the approximate location along the generated route. The MNI, by utilizing map matching and other relevant algorithms, can make a determination whether the mobile vehicle must transmit large payloads containing heading, speed and other information. This decision can be transmitted to the mobile vehicle by toggling the record upload bit. This embodiment is leveraged when a vehicle is traversing a long stretch of freeway. In this case, the hardware isn't required to make frequent and costly large payload uploads to the server.

The next embodiment involves floating car data (FCD) collection. Traffic data acquired via FCD techniques may be contingent upon getting an accurate assessment of link speeds and travel times. There are several methods within the scope of this invention for computing these quantities. Although somewhat more involved with regard to in-vehicle functionality, accessing the vehicle speed directly off the bus of each probe (sensor inquiry) may be the most reliable method for computing link speeds and travel times. In order for an aggregation routine at the MNI to accurately capture the distribution of speeds across each link at any point in time, speeds may need to be measured relatively frequently. The optimal collection rate can be determined by examining the distribution of link lengths and their respective posted speed limit, with the aim of sampling frequently enough to capture a change in probe velocity populations on links. For one embodiment of the invention, this rate lies between once every second to once every 10 seconds.

The requirement for reliably accurate link speeds and travel times, poses requirements on the accuracies of the vehicle speeds and headings being sampled. If using a simple averaging scheme for aggregating probe velocities, the dependence of aggregated link speeds on individual probe speeds diminishes as the number of probes increases. The propagation of errors can therefore be expressed by the equation $$\Delta v_{link} = \frac{\Delta v_{probe1}}{n} + \frac{\Delta v_{probe2}}{n} + \frac{\Delta v_{probe3}}{n} + \ldots,$$

where, n is the number of probes on a link during a specified time interval.

The speed data collected may be buffered for 2-5 minutes before transmitting to the MNI or call center. The optimal buffering and transmission intervals may be dictated by the timeliness of traffic data, link lengths, posted speeds, clearing times for incidents and lead time required for drivers to make route adjustments. The objective is to deliver traffic information in a timely enough fashion in order to allow for rerouting or other delay avoidance planning.

The next embodiment of the invention may collect GPS coordinate data and time stamps every 1–10 seconds. Through analysis of GPS speeds vs. vehicle speeds, this embodiment assumes that their accuracy and reliability is comparable. Additionally, if the sampling rate is high, GPS speeds can be reliably derived at the MNI. This embodiment's hardware requires the capability to buffer location, speed, and time stamp information for 2–5 minutes. This may require two memory buffers of a minimal size of approximately 100–200 bytes to be assigned for the purpose. The need for two (and not one) such buffers arises from the need to avoid overwriting a buffer before it is fully and successfully transmitted.

Another embodiment may provide for an on/off bit to be remotely controlled by the MNI or call center. The concept of selective probes previously described, is based on the premise that a probe should transmit its 2–5 minute buffers of location and speed information, only when it needs to. For example, if the number of probes on a link is in excess of the requisite 3% for freeways, or if link traffic can be characterized by streamline flow, not all the probes need to transmit. The remainder can be turned off, thus minimizing and optimizing the number of simultaneous transmissions as well as the total transmissions per annum. Execution of this selective functionality can be achieved via the presence of an on/off bit that dictates whether or not the probe transmits during a specified time interval. This bit may be controlled by the MNI collocated at either the wireless carriers system, or the call center.

In the presence of more than one bearer mechanism, it may become necessary to employ a link manager, as are known in the art, that optimizes and prioritizes the use of the available mechanisms based on a fixed set of heuristics and algorithms. Additionally, a timer is required to manage the intermittent collection of vehicle speed data at intervals of 1–10 seconds. When the transmission bit is remotely set to "on", the buffered traffic data must be transmitted to the OCC every 2–5 minutes. The time management of this intermittent transmission may impose the requirement for a second timer. A third timer may be required to manage the low payload transmission of position data to the MNI, so that the MNI can in turn effectively manage selective transmissions from probes.

The transmission of location and velocity data may further require the definition of a new AIF message or equivalent in the event that AIF is replaced by a more general protocol in the future. These AIF messages can be utilized for other mobile vehicle services that require similar transmissions. Some notable examples include turn-by-turn server based navigation and route following and usage based insurance. The former service has remarkably similar requirements in as much as vehicle speed, position and heading data upload from the vehicle on an intermittent basis in a timely and accurate fashion. The higher payload message may be transmitted every 2–5 minutes, and is destined for the call center. The lower payload message may be transmitted every 2–10 seconds. The destination of this category of transmission is ultimately the central intelligence that manages the selective transmissions of probes.

If the optimal location of this intelligence is determined to be at the wireless communication system or other in-network location, then these messages may be designed to be stripped and read at an intermediate location before reaching the call center. Alternatively, if the optimal location of the intelligence is determined to be the call center, more customary requirements can apply. However, this scenario would impose strict latency requirements, in order to ensure that the probe presence data on any given link is not aged. Aged data, can lead to the erroneous management of selective transmissions by the MNI.

The standard transmission packet size, in conjunction with message size for each of the categories of transmissions, can determine the appropriate level of compression and tokenization. Additionally, there are certain messages, and therefore vehicle data, that are only available to the call center when the vehicle is awake. In these cases, if a subscriber queried their car, there would be certain data that would be unavailable to them. A further embodiment of the invention can allow this data to be available to the call center at any time. These cases may include monitoring a specified bus message continually and storing the data at ignition off; and sending a bus message at ignition on plus a delay and storing the result. These could be utilized to retrieve any data whether the vehicle is on or off by applying the following logic:

---

Ignition on
    Send bus request and reply with response (bus pass-thru AIF message)
    Else
        Send bus request
        No response
            Read data from "last stored table" for corresponding bus message
        Else
            Reply with response
        End
    End

---

Returning to the flow chart illustration in FIG. 3, the vehicle data upload method 300 provides another embodiment of the invention utilizing all or part of the previously described embodiments. This embodiment begins with multiple probes for vehicle attributes (queried sensor data) uploading location (trailing digits), heading and speed data to the VCU 310. The VCU may provide the data to a mobile network intelligence 320 utilizing wireless communication from the vehicle to the MNI. The MNI next process the acquired information (data) as a function of varying algorithms 330 specific to the previously described services. The MNI may process data from each probe by using map matching algorithms to infer link IDs and the number of probes on each link. The MNI may access 340 a historical database 350 to use historical speed and volume to infer the ratio of number of probes to the total link volume for each link, as well as to determine the flow characteristics on a link, such as streamline flow, chaotic flow, etc. The MNI may use this inferred information to make control (new sensor attributes) determinations or to turn probes on/off 360. This embodiment of the invention may further determine the following:

[1] The MNI may check to see if these probes are still on the same links or progression of links as when they uploaded their data buffers. If not, it conducts appropriate probe management to account for the discrepancies.

[2] The MNI can send messages to relevant probes to disable their enhanced continuous storage trigger and upload trigger bits.

[3] For the probes that are still storing and transmitting, the continue logging while uploading capability is being utilized.

[4] Approximate location information in the network permits the storage and upload of trailing digits only for location information.

[5] For probes with storage bits enabled but upload bits disabled, the buffer overwrite functionality can compensate for any possible discrepancies.

[6] The configurable time associated with the conditional loop logic that tests for real time trigger event values may be set to 5 minutes within one embodiment of the invention.

[7] Also within one embodiment of the invention, absolute data for location may be truth referenced once a week for accuracy against an accurate source of location information in the network and;

[8] The MNI may set the appropriate bits to increase payload efficiency.

Next the upload method 300 provides the new attribute data (probe instructions) to the VCU via wireless communications 370. The VCU may provide the attribute data to the associated sensors (probes) 380 and the probes may make adjustments in accordance with what they are instructed to do 390. The method may then repeat 310 to maintain real time traffic information.

The above-described methods and implementation for vehicle data uploading and associated information are example methods and implementations. These methods and implementations illustrate one possible approach for ascertaining a vehicle's preset data and associated information. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

We claim:
1. A method for vehicle data upload comprising:
activating at least one action trigger as a function of a vehicle communication unit, wherein the action trigger is an event trigger selected from a group consisting of a storage trigger, a continuous monitoring trigger, a collection trigger, a upload trigger, and a enhanced continuous monitoring trigger;
collecting at least one attribute data within a mobile vehicle as a function of the action trigger;
transmitting the attribute data from the vehicle communication unit to a mobile network intelligence;
determining a second attribute data as a function of the attribute data;
producing a second action trigger as a function of the second attribute data;
transmitting the second action trigger from the mobile network intelligence to the vehicle communication unit; and
overwriting the action trigger as a function of the second action trigger.

2. The method of claim 1 wherein the action trigger is a storage trigger.

3. The method of claim 1 wherein the action trigger is an upload trigger.

4. The method of claim 3 wherein the upload trigger is a function of an attribute in communication with a mobile vehicle communication center.

5. A method for vehicle data unload comprising:
activating at least one action trigger as a function of a vehicle communication unit, wherein the action trigger is a data trigger selected from a group consisting of minutes, kilometers, ignition on, ignition off, number of ignition cycles, timestamp, days, and miles;
collecting at least one attribute data within a mobile vehicle as a function of the action trigger;
transmitting the attribute data from the vehicle communication unit to a mobile network intelligence;
determining a second attribute data as a function of the attribute data;
producing a second action trigger as a function of the second attribute data;
transmitting the second action trigger from the mobile network intelligence to the vehicle communication unit; and
overwriting the action trigger as a function of the second action trigger.

6. The method of claim 5 wherein the action trigger is a storage trigger.

7. The method of claim 5 wherein the action trigger is an upload trigger.

8. The method of claim 7 wherein the upload trigger is a function of an attribute in communication with a mobile vehicle communication center.

9. A method for vehicle data upload comprising:
generating a route at a call center, the route comprising road information and maneuver instructions;
determining a current vehicle location and heading;
receiving truncated current vehicle location and heading information from the vehicle, wherein the truncated current vehicle location comprises a vehicle location modified by at least one method to improve record payload efficiency wherein the at least one method to improve record payload efficiency is selected from the group consisting of truncating leading, trailing and empty field zeros, sinusoids of angles, data relative to an initial point of reference within an ignition cycle, choice of compression/tokenization schemes, data stripping and adding tokenization algorithms during upload or download;

determining a need for a large payload vehicle data upload; and receiving a large payload vehicle data upload in response to the determination.

10. The method of claim 9 wherein determining a need for a large payload comprises map matching.

* * * * *